United States Patent
Wolf

Patent Number: 5,818,223
Date of Patent: *Oct. 6, 1998

[54] ROTARY POSITION SENSOR WITH CIRCULAR MAGNET

[75] Inventor: Ronald J. Wolf, Elkhart, Ind.

[73] Assignee: Durakool, Inc., Elkhart, Ind.

[*] Notice: The term of this patent shall not extend beyond the expiration date of Pat. No. 5,497,081.

[21] Appl. No.: 649,987

[22] Filed: May 17, 1996

Related U.S. Application Data

[63] Continuation of Ser. No. 486,650, Jun. 7, 1995, Pat. No. 5,757,181, which is a continuation-in-part of Ser. No. 51,412, Apr. 28, 1993, Pat. No. 5,497,081, which is a continuation-in-part of Ser. No. 902,075, Jun. 22, 1992, Pat. No. 5,332,965.

[51] Int. Cl.[6] .............................. G01B 7/14; G01D 5/14; F02P 7/06
[52] U.S. Cl. ................................. 324/207.12; 324/207.2
[58] Field of Search ................. 324/207.12, 207.22, 324/207.21, 207.2, 207.25, 235, 225, 228; 123/612, 617

[56] References Cited

U.S. PATENT DOCUMENTS

| | | |
|---|---|---|
| 2,924,633 | 2/1960 | Sichling . |
| 3,028,092 | 4/1962 | Fay III . |
| 3,112,464 | 11/1963 | Ratajski et al. . |
| 3,162,932 | 12/1964 | Wood et al. . |
| 3,184,620 | 5/1965 | Leibowitz et al. ..................... 338/32 H |
| 3,663,843 | 5/1972 | Smith . |
| 3,818,292 | 6/1974 | Berman . |
| 3,893,502 | 7/1975 | Slamar ......................................... 164/4 |
| 4,392,375 | 7/1983 | Eguchi et al. ............................. 73/118 |
| 4,570,118 | 2/1986 | Tomczak et al. . |
| 4,893,502 | 1/1990 | Kubota et al. . |
| 5,003,363 | 3/1991 | Lachman ................................... 357/27 |
| 5,497,081 | 3/1996 | Wolf et al. .......................... 324/207.12 |
| 5,572,120 | 11/1996 | Takaishi et al. . |

FOREIGN PATENT DOCUMENTS

| | | |
|---|---|---|
| 0 175 831 A2 | 12/1984 | European Pat. Off. . |
| 363-738 | 4/1990 | European Pat. Off. . |
| 2 715 726 | 1/1994 | France . |
| 31 44283 A1 | 5/1983 | Germany . |
| 40 14 885 A1 | 11/1990 | Germany . |
| 42 15 641 A1 | 12/1992 | Germany . |
| WO 88/07172 | 9/1988 | WIPO . |
| WO 92/10722 | 6/1992 | WIPO . |

Primary Examiner—Walter E. Snow
Attorney, Agent, or Firm—Fitch, Even, Tabin & Flannery

[57] ABSTRACT

A rotary position sensor for sensing the angular position of a pivotally mounted device, such as a throttle valve. The rotary position sensor includes a generally circular magnet with a central aperture. A magnetic sensing element, such as a Hall effect integrated circuit (IC) is disposed within the aperture to reduce the overall size of the sensor. In order to improve performance of the sensor, one or more flux concentrators are disposed adjacent the magnetic sensing element within the central aperture of the magnet, while keeping the overall size of the sensor to a minimum to enable the sensor to be utilized in applications where space requirements are generally critical, such as automotive applications.

14 Claims, 6 Drawing Sheets

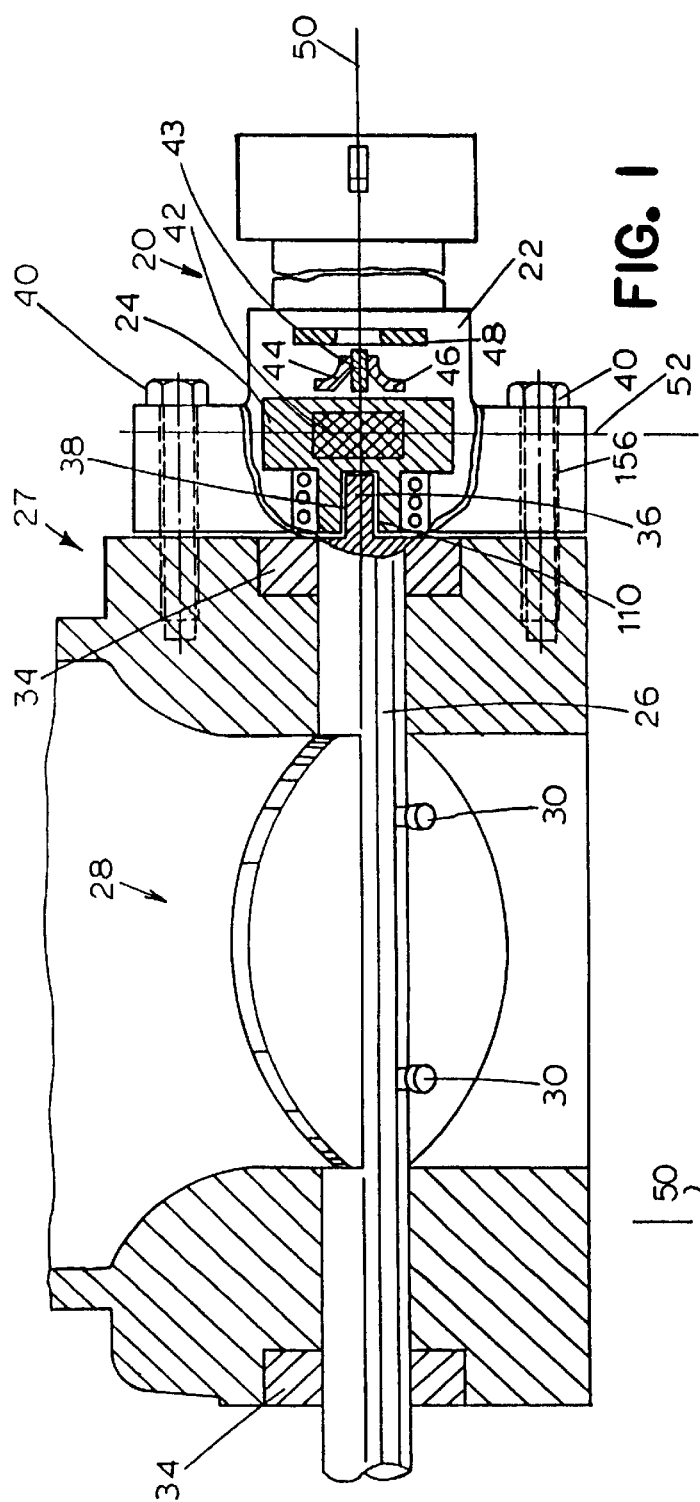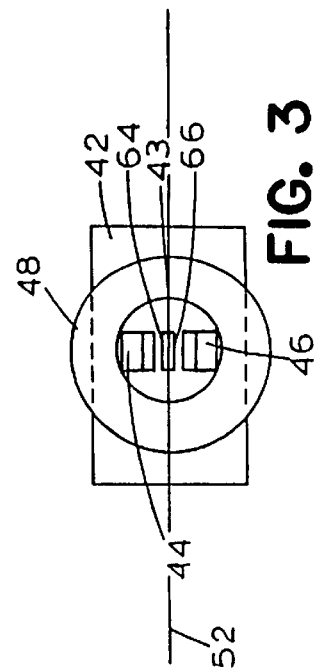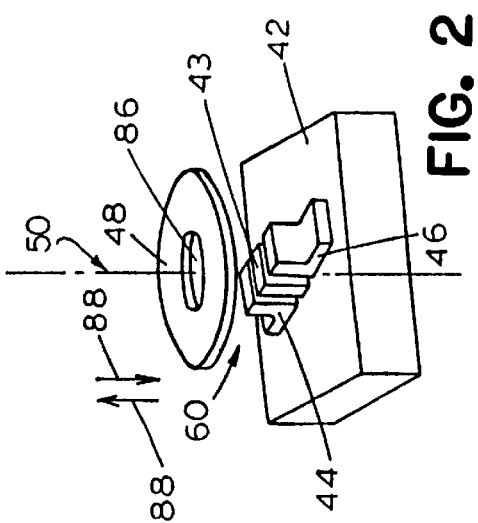

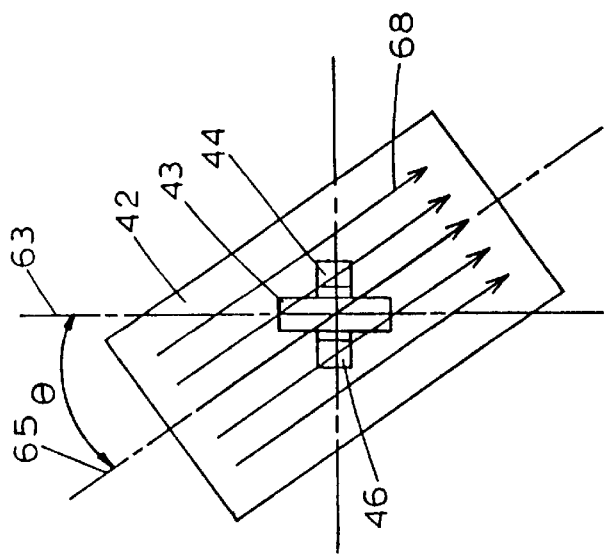
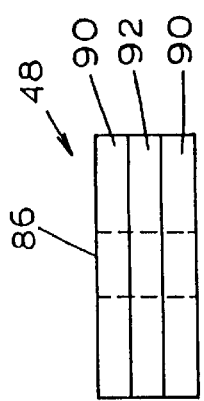
FIG. 6
FIG. 10
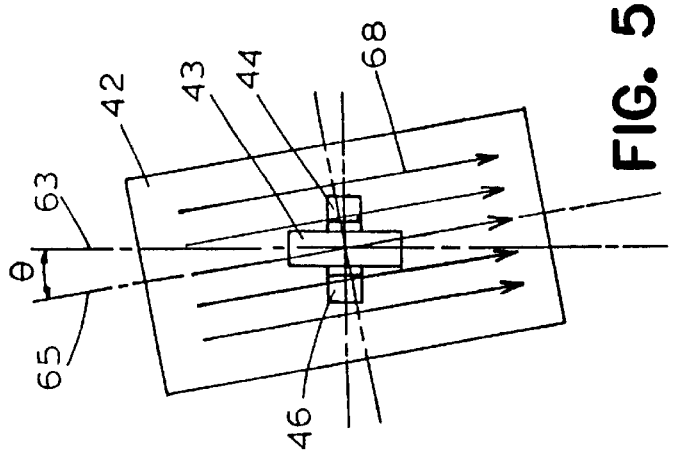
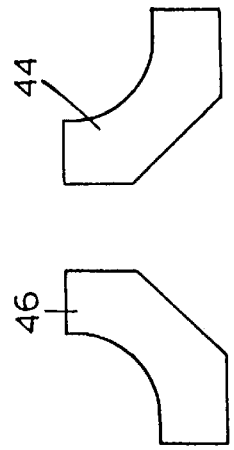
FIG. 5
FIG. 9
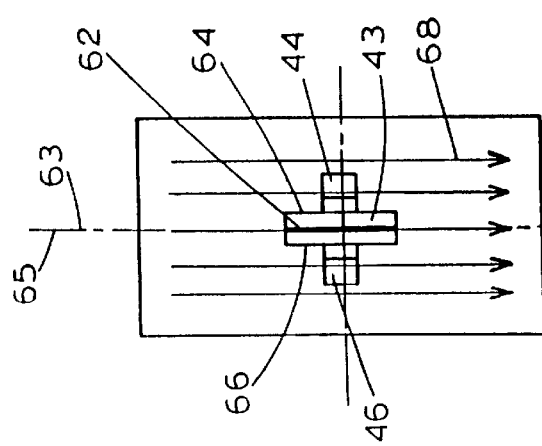
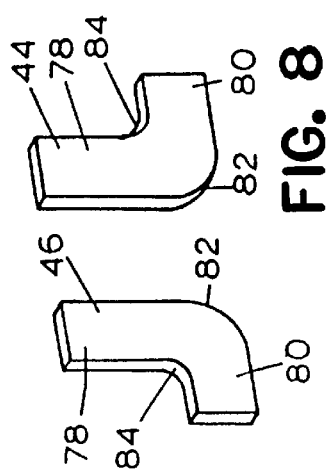
FIG. 4
FIG. 8

5,818,223

ROTARY POSITION SENSOR WITH CIRCULAR MAGNET

CROSS-REFERENCE TO RELATED APPLICATIONS

This application is a continuation of U.S. patent application Ser. No. 08/486,650, filed on Jun. 7, 1995, now U.S. Pat. No. 5,757,181, which is a continuation-in-part of U.S. patent application Ser. No. 08/051,412 filed on Apr. 28, 1993, now U.S. Pat. No. 5,497,081 which is a continuation-in-part of U.S. patent application Ser. No. 07/902,075, filed on Jun. 22, 1992, now U.S. Pat. No. 5,332,965.

BACKGROUND OF THE INVENTION

1. Field of the Invention

The present invention relates to an angular position sensor, and more particularly, to a linear non-contact angular position sensor for sensing the angular position of a pivotally mounted device, such as a throttle valve, which includes a generally circular magnet with a central aperture and a magnetic sensing element, such as a Hall effect integrated circuit disposed in the central aperture, which minimizes the space requirements or the sensor to enable the sensor to be used in applications where space is critical.

2. Description of the Prior Art

Angular position sensors are known to be used for various purposes including throttle position sensors for determining the angular position of a butterfly valve in a throttle body. Examples of such sensors are disclosed in U.S. Pat. Nos. 4,893,502 and 5,332,965. Such sensors are generally used to sense the angular position of the butterfly valve in the throttle body in order to control the amount of fuel applied to the combustion chamber of an internal combustion engine.

Various angular position sensors are known in the art. An example of such an angular position sensors is disclosed in U.S. Pat. No. 4,893,502 as well as published International Application WO 88/07172. Each of the rotary position sensors disclosed in the above-mentioned references includes a generally circular magnet and a magnetic sensing device, such as a Hall effect element. Unfortunately, in the case of U.S. Pat. No. 4,893,502, the sensing device is not disposed within the plane of the magnet. Similarly, the PCT Application WO 88/07172 discloses a circular magnet with a magnetic sensing device such as a Hall effect device disposed outside the perimeter of the magnet. Unfortunately, such configurations increase the overall size of the sensor, thus making such sensors unsuitable for certain applications, including automotive applications, where space requirements are critical.

SUMMARY OF THE INVENTION

It is an object of the present invention to solve various known problems associated with angular position sensors.

It is yet another object of the present invention to provide an angular position sensor that is adapted to be utilized in applications where the space requirements are critical.

Briefly, the present invention relates to an angular position sensor for sensing the angular position of a pivotally mounted device, such as a throttle valve which includes a generally circular magnet with a central aperture and a magnetic sensing element, such as a Hall effect integrated circuit (IC). In order to reduce the overall size of the sensor, the magnetic sensing unit is disposed within the central aperture of the magnet. In order to improve the operation of the sensor, one or more flux concentrators may be disposed adjacent the magnetic sensing element within the central aperture of the magnet.

BRIEF DESCRIPTION OF THE DRAWING

These and other objects of the present invention will be readily understood with reference to the specification and the following drawing, wherein:

FIG. 1 is a sectional view, partially broken away, of a throttle body with an angular position sensor in accordance with the present invention attached thereto;

FIG. 2 is a simplified perspective view of the angular position sensor in accordance with the present invention;

FIG. 3 is a plan view of the angular position sensor illustrated in FIG. 2;

FIG. 4 is a simplified plan view of the angular position sensor in accordance with the present invention illustrating the relationship between the angular position sensor and the magnetic flux in a static position;

FIGS. 5 and 6 are similar to FIG. 4 and illustrate the relationship between the angular position sensor and the magnetic flux in various operating positions;

FIG. 8 is a perspective view of a pair of flux concentrators which form a portion of the present invention;

FIG. 9 is an elevational view of an alternate embodiment of the flux concentrators illustrated in FIG. 8;

FIG. 10 is an elevational view of a halo-shaped flux concentrator which forms a portion of the present invention;

FIG. 11 is a perspective view of one embodiment of a carrier assembly in accordance with the present invention, shown with a flux concentrator removed;

FIG. 12 is a perspective view of the assembly illustrated in FIG. 11 in a further stage of development;

DETAILED DESCRIPTION OF THE PREFERRED EMBODIMENT

Figure 7:
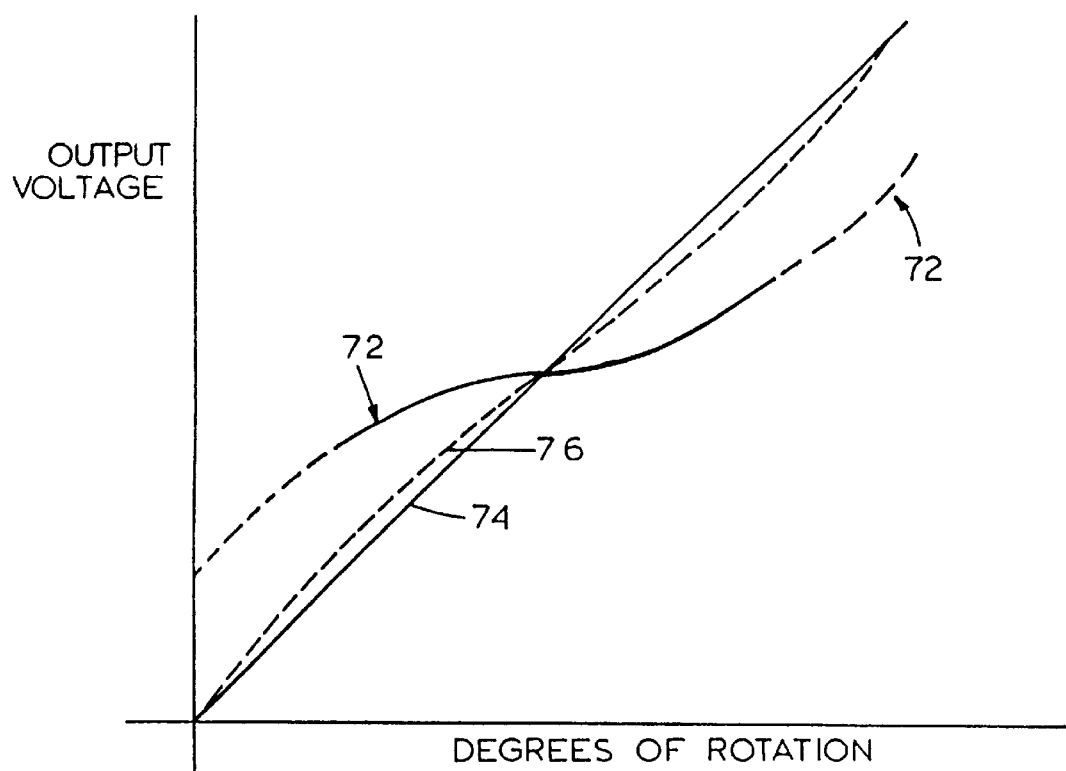
FIG. 7 is an exemplary graph illustrating the relationship between the output voltage of the angular position sensor versus degrees of rotation shown in dotted line with a superimposed curve which illustrates the effects of the flux concentrators in accordance with the present invention.

Referring first to FIGS. 1–17, the first embodiment of the angular position sensor 20 is adapted to be adjusted mechanically which eliminates the need for potentiometers and the like, used to calibrate known angular position sensors, such as the angular position sensor disclosed in U.S. Pat. No. 4,893,502. As discussed above, such potentiometers and the like are temperature dependent. Thus, in relatively hostile temperature environments, the calibration of such sensors is affected.

As will be appreciated by those of ordinary skill in the art, the angular position sensor 20 is adapted to be used in various applications for providing a signal representative of the angular position of a pivotally mounted device. The angular position sensor 20 is illustrated and discussed below in an application as a throttle position sensor. However, it should be appreciated by those of ordinary skill in the art that the application of the angular position sensor 20 in accordance with the present invention is also useful for various other applications.

With reference to FIG. 1, the angular position sensor 20 is disposed in its own housing 22 and includes a drive arm 24, rotatably mounted relative to the housing 22, that enables the sensor 20 to be mechanically coupled to an output shaft of a pivotally mounted device. In an application, such as a throttle position sensor, the drive arm 24 is mechanically coupled to a butterfly valve shaft 26 carried by a throttle body 27. More particularly, in such an application, a butterfly valve 28 is rigidly affixed to the rotatably mounted shaft 26 with suitable fasteners 30 or by spot welding. The shaft 26 is rotatably mounted relative to a throttle body 27 with suitable bearings 34.

The butterfly valve 28 is formed to close or throttle the air flow to an internal combustion engine (not shown). By coupling the angular position sensor 20 to the butterfly valve shaft 26, the angular position sensor 20 is adapted to provide a signal representative of the angular position of the butterfly valve 28 for use in controlling the amount of fuel applied to the combustion chamber in an internal combustion engine.

It is contemplated that the shaft 26 and the drive arm 24 be prevented from rotating relative to each other. Various means can be used for preventing such rotation; all of which are intended to be included within the broad scope of the invention. As shown, the butterfly valve shaft 26 is formed with a reduced cross-sectional area portion or tongue 36 which extends outwardly from one side of a throttle body 27 to allow engagement with the drive arm 24. In order to prevent the rotation of the tongue 36 relative to the drive arm 24, the tongue 36 may be formed with a non-circular cross-section that is adapted to mate with a cooperating recess 38 formed in the drive arm 24.

Another important aspect of the angular position sensor 20 is that it is formed as a separate unit that is adapted to rather quickly and easily be secured to, for example, the throttle body 27 by way of suitable fasteners 40. By providing the angular position sensor 20 as a separate unit, the calibration of the sensor 20 can be done at the factory by the sensor manufacturer. In contrast, some known angular position sensors are incorporated directly into the throttle body, for example, as disclosed in U.S. Pat. No. 4,893,502. In such an embodiment, calibration of the sensor is normally done by the throttle body manufacturer whose experience with such sensors is admittedly less than the sensor manufacturer.

FIGS. 2 and 3 illustrate the basic principles of the angular position sensor 20 in accordance with the present invention. In particular, the angular position sensor 20 includes a magnet 42, preferably a standard bar-shaped magnet defining opposing North and South magnetic poles, a magnetic sensing element 43, a pair of generally L-shaped flux concentrators 44 and 46 and an additional flux concentrator 48, used for adjustment. As will be discussed in more detail below, the magnet 42 is adapted to be mounted in the drive arm 24 for rotation about an axis 50 (FIG. 1) that is generally perpendicular to a magnetic axis 52 which interconnects the opposing North and South magnetic poles, as shown in FIG. 1. As will be discussed in more detail below, the magnet 42 is mounted within the drive arm 24 such that the axis of rotation 50 of the magnet is coaxial with the butterfly valve shaft 26 and generally perpendicular to the magnetic axis 52 such that rotation of the butterfly valve shaft 26 causes rotation of the magnet 42 about the axis 50 by a corresponding amount.

The magnetic sensing element 43 is preferably a Hall effect IC with on-chip amplifier circuits, for example, an Allergo Model No. 3506. Since the angular position sensor 20 is adjusted mechanically, there is no need for external circuitry for electrically adjusting the sensor 20. As such, the output of the magnetic sensing device 43 is adapted to be directly coupled to the fuel control circuit (not shown) for the internal combustion engine. By eliminating the need for external potentiometers or variable resistors, the need for conductive tracings on a printed circuit board to connect the magnetic sensing device 43 to such external potentiometers or variable resistors is eliminated. As mentioned above, the conductive tracings in such an application can act as antennas and thus subject the sensor to various electromagnetic interference. In sensors which incorporate such external potentiometers or variable resistors for adjustment, for example, as disclosed in U.S. Pat. No. 4,893,502, the circuitry must be shielded against electromagnetic interferences which adds to the cost of the sensor. Such external potentiometers or variable resistors are also affected by temperature. Thus, in a relatively hostile environment, such as an under-hood environment of an internal combustion engine, the calibration drifts with temperature change. The angular position sensor 20 in accordance with the present invention solves these problems by using a mechanical adjustment for the sensor which eliminates the need for external potentiometers and the like.

Figure 13:
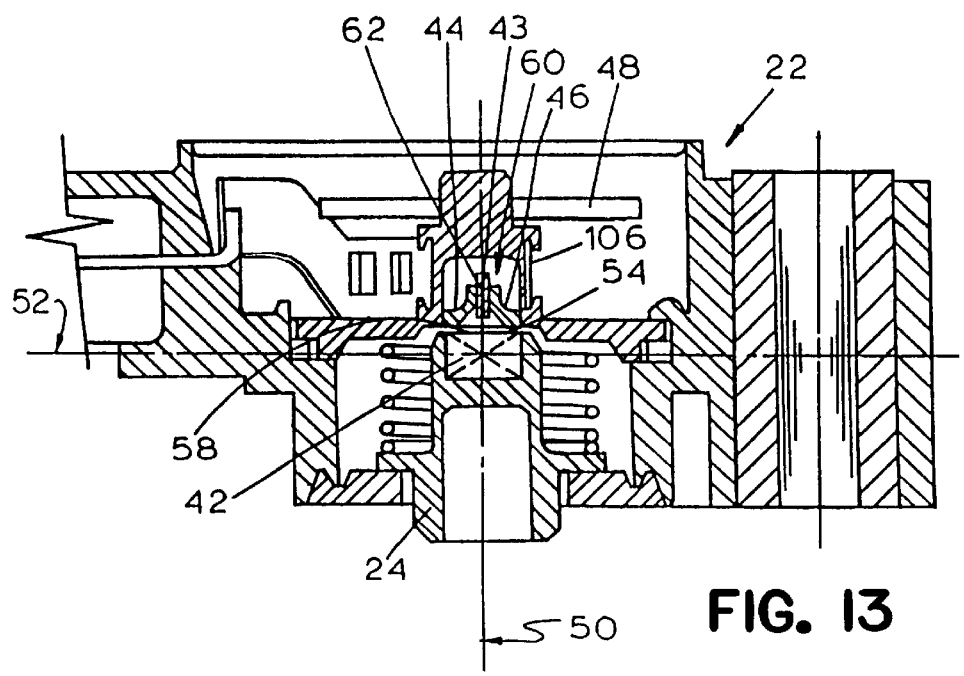
FIG. 13 is a cross-sectional view of an angular position sensor incorporating the carrier assembly illustrated in FIGS. 11 and 12.

As best shown in FIG. 13, the magnetic sensing element 43 is mounted stationary relative to the housing 22 at a fixed air gap 54 relative to a surface 58 of the magnet 42 that is generally parallel to the magnetic axis 52. The generally L-shaped flux concentrators 44 and 46 are rigidly disposed relative to the magnetic sensing device 43 forming an assembly 60. In particular, the magnetic sensing device 43 is sandwiched between the generally L-shaped flux concentrators 44 and 46 to form the assembly 60. The assembly 60 is disposed such that a sensing plane 62, defined by the magnetic sensing element 43, is generally parallel to the axis of rotation 50 of the magnet 42. As shown, a Hall effect IC is used as the magnetic sensing element 43. In such an embodiment, the sensing plane 62 is defined as a plane generally parallel to opposing surfaces 64 and 66, shown in FIG. 4.

As shown in FIG. 2, the assembly 60 is disposed such that the axis of rotation 50 of the magnet 42 is through the midpoint of the magnetic sensing device 43 and parallel to the sensing plane 62. However, it is also contemplated that the assembly 60 can be disposed such that the axis of rotation 50 is offset from the midpoint of the magnetic sensing element 43 along an axis generally parallel to the sensing plane 62.

As shown in FIG. 4, the angular position sensor 20 is in a quiescent state. In this state the magnetic flux density B, represented by the arrows identified with the reference numeral 68, is generally parallel to the sensing plane 62 of the magnetic sensing device 43. In this state the magnetic sensing element 43 outputs a quiescent voltage. For an Allegro Model No. 3506 Hall effect IC, the quiescent output voltage is typically about 2.5 volts DC. Rotating the magnet 42 counterclockwise as shown in FIGS. 5 or 6 or clockwise (not shown) causes an ever increasing amount of magnetic flux density 68 to be applied to the sensing plane 62 of the magnetic sensing element 43 to vary the output voltage of the magnetic sensing element 43 as a function of an angle θ defined between an axis 63 parallel to the sensing plane 62 and an axis 65. For an Allegro Model No. 3506, the output voltage swing is approximately ±2.0 volt DC depending on the direction of the angular rotation.

In accordance with an important aspect of the invention, the relationship between the axes 63 and 65 can be varied in order to adjust the offset voltage of the sensor 20. In particular, the assembly 60 is rotated relative to the magnet 42 in a quiescent state to adjust the sensor offset voltage. In such an application, the sensor would be configured in the quiescent state to have a small angle θ between the axes 63 and 65 as illustrated in FIG. 4.

As will be discussed in more detail below, an important aspect of the invention relates to the fact that the output voltage of the angular position sensor 20 varies linearly as a function of the angular rotation of the magnet 42. As such, the output voltage of the angular position sensor 20 can be applied directly to the fuel consumption circuit for the internal combustion engine without the need for additional and expensive external circuitry. In particular, known angular position sensors have utilized various circuitry including microprocessors to linearize the output voltage, which adds to the complexity and cost of the sensor. The angular position sensor 20 in accordance with the present invention eliminates the need for such external circuitry. In particular, the output signal is linearized by way of the generally L-shaped or book-end type flux concentrators 44 and 46, which not only direct the magnetic flux and control the density and polarity of the magnetic flux density but also linearize the output signal to near straight line form. As such, the angular position sensor 20, in accordance with the present invention, is adapted to be substituted for potentiometer-type throttle position sensors which are contact devices with a finite life. More particularly, FIG. 7 illustrates a graph of the output voltage of the angular position sensor 20 as a function of the degrees of rotation. The solid line 72 represents the output of the angular position sensor 20 without the book-end shaped flux concentrators 44 and 46. As shown, the output voltage of such an embodiment varies relatively non-linearly relative to the degrees of rotation. By incorporating the book-end shaped flux concentrators 44 and 46, the output voltage of the angular position sensor 20 becomes fairly linear. More particularly, the solid line 74 represents the desired relationship between the output voltage of the angular position sensor 20 versus the degrees of rotation of the magnet 42. The dashed line 76 represents the output voltage of the sensor 20 which incorporates the book-end shaped flux concentrators 44 and 46. As illustrated, the dashed line 76 is fairly linear over the anticipated operating range of the sensor, for example, 110° rotation.

The book-end shaped flux concentrators 44 and 46 are formed from a magnetically soft material—a magnetically permeable material which does not retain residual magnetism. Various configurations of the book-end shaped flux concentrators 44 and 46 are contemplated, for example, as shown in FIGS. 8 and 9. Referring to FIG. 8, the book-end flux concentrators 44 and 46 are formed in a generally L-shape defining two depending leg portions 78 and 80. The outer intersection of the depending legs 78 and 80 defines a heel portion 82. The inner intersection of the depending legs 78 and 80 defines a generally arcuately-shaped inner portion 84. It is also contemplated that the inner portion 84 may be formed such that the depending leg portions 78 and 80 are virtually perpendicular at the point of inter-section or have a predetermined radius of curvature as illustrated in FIG. 8.

In the preferred embodiment illustrated in FIG. 9, the flux concentrators 44 and 46 are formed in a similar manner as the flux concentrators illustrated in FIG. 8 but with the heel portion 82 removed and a relatively larger radius of curvature for the inner portion 84.

In accordance with another important aspect of the invention, the sensor 20 allows the sensitivity (e.g., volts/degree of rotation) of the sensor 20 to be adjusted mechanically. As discussed above, various known sensors utilize potentiometers or variable resistors and the like for varying the sensitivity of the sensor. However, such sensors are relatively temperature dependent. Thus, in a relatively hostile environment where the temperature is anticipated to vary over a relatively wide range, the calibration of such sensors is known to drift. The angular position sensor 20 in accordance with the present invention solves this problem by providing a method for mechanically adjusting the sensitivity of the sensor without the need for potentiometers and the like. In particular, an additional flux concentrator 48 is provided. Although the flux concentrator 48 is described and illustrated having a halo or washer shape, as illustrated in FIG. 2, for example, it is to be understood that various shapes for the flux concentrator 48 are contemplated. For example, a rectangular shape may be used for the flux concentrator as illustrated and identified with reference numeral 48' in FIG. 15. In such an embodiment, various means within the ordinary skill in the art are contemplated for supporting the flux concentrator 48 relative to the magnet 42.

In the preferred embodiment, the flux concentrator 48 is formed in a generally circular or halo shape with a centrally disposed aperture 86. The flux concentrator 48 is adapted to be disposed such that the midpoint of the aperture 86 is generally coaxial with the axis of rotation 50 of the magnet 42. The sensor's sensitivity is adjusted by varying the distance between the flux concentrator 48 and the magnet 42 in an axial direction relative to the axis of rotation 50 as indicated by the arrows 88 (FIG. 2). It is contemplated that the plane of the flux concentrator 48 be generally parallel the plane of the magnet 42. The halo-shaped flux concentrator 48 thus provides a mechanical and relatively stable method for adjusting the sensitivity of the sensor 20 utilizing a relatively inexpensive and until now often impractical class of linear IC; impractical because of the relatively wide range of part-to-part electrical output values of offset voltage and sensitivity per gauss.

In an alternate embodiment of the invention as illustrated in FIG. 10, it is contemplated that the flux concentrator 48 be formed to be self-temperature compensating. In this embodiment, the flux concentrator 48 may be formed in a plurality of layers. Three layers are shown for example. The outer layers 90 are formed from a first material, for example, an iron-nickel alloy comprised of approximately 29%–33% nickel. The inner layer 92 is formed from low carbon steel, for example, C1008 low carbon steel. With such an embodiment, the properties of the nickel alloy used in the outer layers 90 cause the permeability of the outer layers 90 to decrease with an increase in temperature which decreases the ability of the flux concentrator 48 to concentrate magnetic flux as a function of temperature. Thus, as the temperature increases, the magnetic flux concentrator 48 captures less of the magnetic field causing a relatively greater portion of the magnetic field to be applied to the magnetic sensing element 43 during such a condition. Thus, since it is known that the magnetic field intensity of known magnets weakens as a function of temperature, the magnetic flux concentrator 48 illustrated in FIG. 10 allows a greater percentage of the magnetic flux density 68 to be applied to the magnetic sensing element 43 during relatively high temperature conditions and is thus self-temperature compensating.

Figure 15:
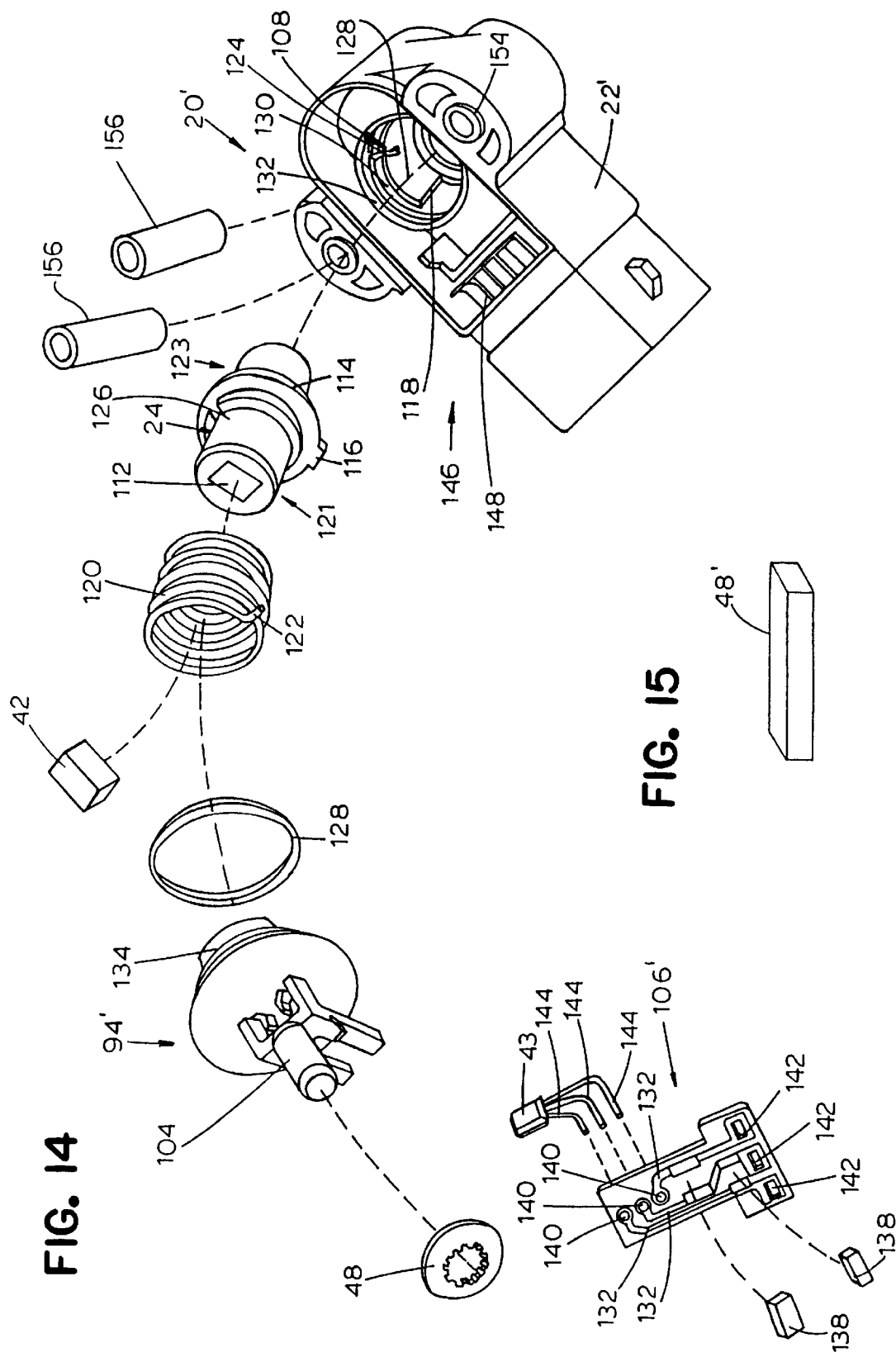
FIG. 15 is a perspective view of a flux concentrator in accordance with the present invention.

FIGS. 11 and 12 illustrate a carrier assembly 94 for carrying the magnetic sensing device 43 as well as the magnetic flux concentrators 44, 46 and a halo-shaped flux concentrator 48. In particular, FIG. 11 illustrates the carrier assembly 94 with the halo-shaped flux concentrator 48 removed. The carrier assembly 94 includes a disk-shaped base portion 96 and a generally T-shaped frame portion 98. The T-shaped frame portion 98 defines a pair of depending legs 100 and 101, disposed generally perpendicular to the plane of the base portion 96, interconnected by a connecting member 102. A stud portion 104 is formed to extend outwardly from the connecting member 102. The stud portion 104, as will be discussed in more detail below, is used for adjusting the distance between the halo-shaped flux concentrator 48 and the magnet 42. In alternate embodiments of the invention where a configuration other than a halo shape is used for the additional flux concentrator, for example, a rectangular shape, as illustrated in FIG. 15, the stud portion 104 is unnecessary and thus eliminated and substituted with a suitable arrangement for supporting such a flux concentrator 48' relative to the magnet 42.

Referring back to the preferred embodiment, the halo-shaped flux concentrator 48 is shown with a generally star-shaped aperture 86. In such an application, the diameter of the stud 104 is formed to provide a friction fit with the irregular-shaped aperture 86 to allow the sensitivity of the sensor 20 to be adjusted by way of axial movement of the flux concentrator 48 relative to the magnet 42. In an alternate embodiment of the invention, it is contemplated that the stud 104 and the aperture 86 be threaded to enable the distance between the flux concentrator 48 and the magnet 42 to be varied by rotating the flux concentrator 48.

The book-end type flux concentrators 44 and 46 are disposed intermediate the depending legs of the T-shaped frame 98 to enable the magnetic sensing device 43 to be sandwiched therebetween. As shown best in FIG. 14, the magnetic sensing device 43 is a three wire Hall effect IC. This magnetic sensing device 43 is adapted to be connected to a flexible printed circuit board 106 (FIG. 12) and wrapped around the frame 98 as best illustrated in FIG. 12. Opposing fingers 105 may also be formed in the depending leg portions 100 and 101 to capture a portion of the printed circuit board 106 as shown. A terminal structure 107 is then connected to the printed circuit board 106 to enable the sensor 20 to be connected to an external electrical conductor (now shown). The terminal structure 107 is shown in FIG. 12 with bridging members 109, which are removed to form three electrical terminals 111, 113 and 115. The carrier assembly 94 complete with the printed circuit board 106 is then assembled to the housing 22 as illustrated in FIG. 13.

Figure 14:
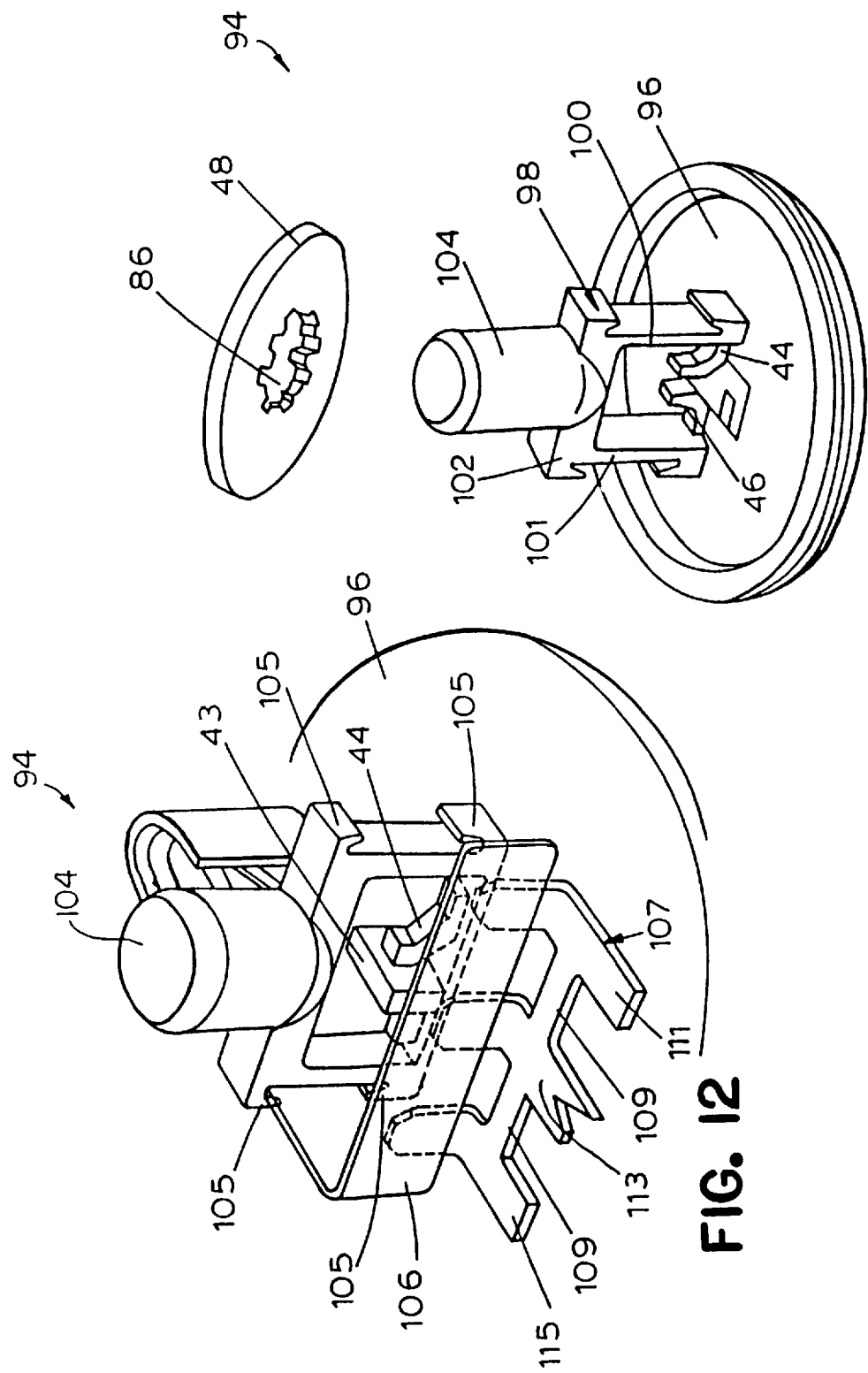
FIG. 14 is an exploded perspective view of an alternate embodiment of the angular position sensor in accordance with the present invention.

An alternate embodiment of the sensor is illustrated in FIG. 14, identified with the reference numeral 20'. In this embodiment, like components are identified with the same reference numerals and are distinguished with primes. The housing 22' is formed as an irregular-shaped housing with a central aperture 108 for receiving the drive arm 24. As best shown in FIG. 1, the drive arm 24 is formed with a centrally disposed aperture 110 on one end (FIG. 1) that is keyed or otherwise adapted to rotate with the butterfly valve shaft 26 defining a drive arm portion 123 (FIG. 14). The other end of the drive arm 24 is provided with a generally rectangular aperture 112 defining a magnet holder portion 121 for receiving the magnet 42. The drive arm 24 is adapted to be received in the aperture 108 formed in the housing 22'. The drive arm 24 may be formed with an integral washer 114 with an extending tongue 116. The tongue 116 cooperates with stops 118 formed within the aperture 108 which are radially disposed to limit the rotation of the drive arm 24 relative to the housing 22'. As will be appreciated by those of ordinary skill in the art, the location of the stops 118 within the aperture 108 are provided to coincide with the expected angular rotation of the device whose angular position is being sensed. As mentioned above, when the angular position sensor 20 in accordance with the present invention is used as a throttle position sensor, the stops 118 are provided to allow for about 110° of rotation. In alternate embodiments of the invention, the housing 22 may be formed without the stops 118 to enable a full 360° of isolation for the sensor 20.

The drive arm 24 may be biased by a torsion spring 120 having extending end portions 122. The bottom end portion (not shown) is adapted to be received in a slot 124 formed in the aperture 108. The top end portion 122 is received in a corresponding slot 126 formed in the drive arm 24. The diameter of the torsion spring 120 is sized to be slightly larger than the magnet holder portion 121. In embodiments wherein the sensor is adapted to rotate 360°, the torsion spring 120 is eliminated.

The aperture 108 is formed with concentric walls 128, 130 and 132. The concentric wall 128 only spans a portion of the circumference of the aperture 108 to form the stops 118 as discussed above. The drive arm portion 123 is received within the aperture 108 to allow rotational movement of the tongue 116 relative to the stops 118, formed in the partial concentric inner wall 128. The magnet holder portion 121 is received in an integrally formed circular guide, 134 formed on the underside of the carrier 94'. Once the drive arm 24 and torsion spring 120 are disposed within the aperture 108, the carrier assembly 94 closes the aperture 108 by way of an O-ring 158 forming the angular position sensor in accordance with the present invention. As shown, the carrier 94' and printed circuit board 106' are configured differently than the embodiment illustrated in FIGS. 11–13.

As shown, the printed circuit board 106' may include three conductive tracings 132 for connecting the electrical conductors 144 from the magnetic sensing element 43 thereto. A pair of capacitors 138, preferably surface mount capacitors, are electrically connected with the conductive tracings 132 to suppress noise-to-ground. Three plated-through holes 140 are provided for connecting the conductors 144 of the magnetic sensing device 43 to the printed circuit board 106'. The printed circuit board 106' includes an additional three plated-through holes 142 for connection with corresponding terminals 148, insert molded into the housing 22', which enables the sensor 20' to be connected to an external electrical conductor (not shown). Once the components of the sensor 20' are assembled, the component side 146 of the sensor 20' is then potted with a suitable potting compound, such as epoxy to seal the electrical components. This allows the electrical components of the sensor to be sealed from moisture, contaminants and the like without the need for a dynamic or a static seal as discussed above. As such, the seal in accordance with the present invention is virtually unaffected by wear or vibration.

As discussed above, the angular position sensor 20, 20' is connected to a throttle body 27 by way of the fasteners 40. Thus, the housing 22, 22' may be provided with a pair of oppositely disposed apertures 154 for receiving a pair of insert molded mounting sleeves 156. The fasteners 40 are received in the mounting sleeves 156 and are used to connect the sensor 20, 20' to the throttle body 27.

Figure 16:
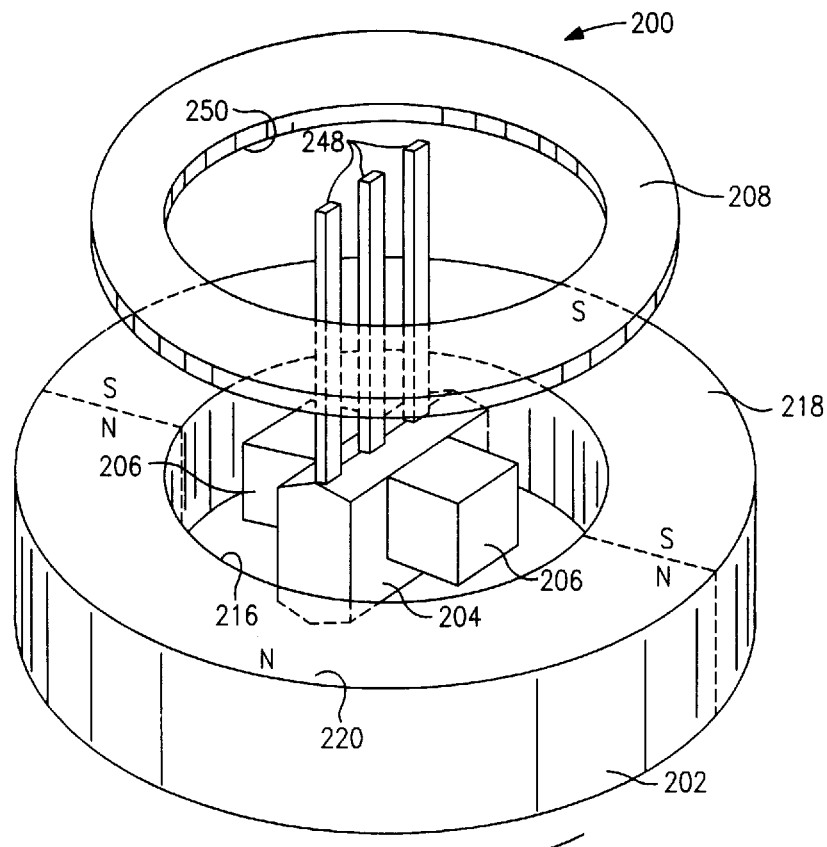
FIG. 16 is a perspective view of an alternate embodiment of the angular position sensor illustrated in FIG. 1.
Figure 17:
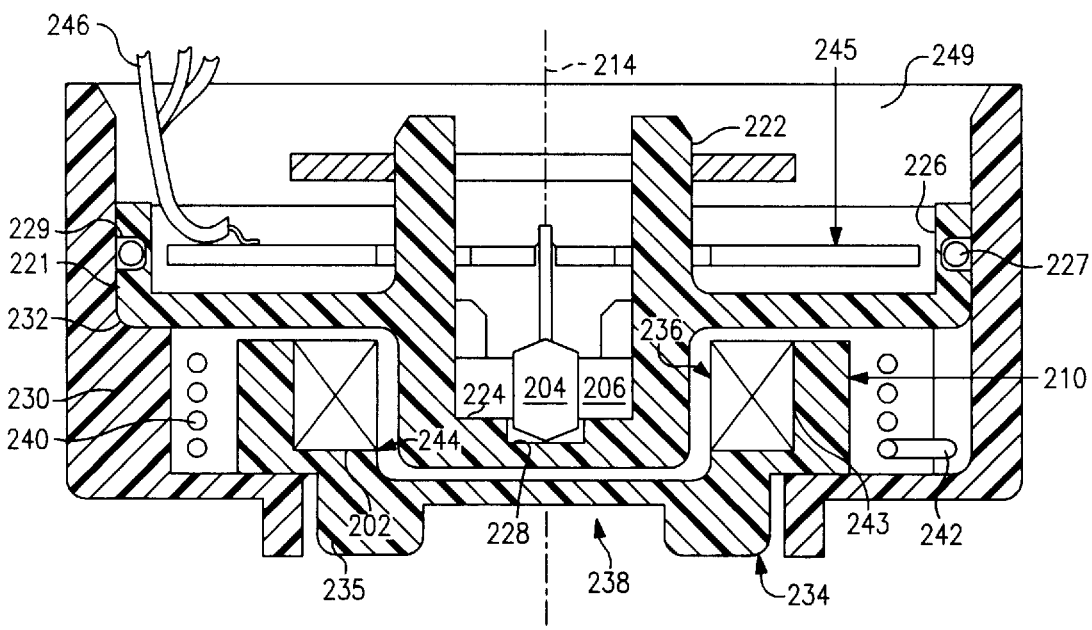
FIG. 17 is a cross sectional view in elevation of the angular position sensor illustrated in FIG. 16.

An alternate embodiment of the throttle position sensor is illustrated in FIGS. 16 and 17 and generally identified with the reference numeral 200. This throttle position sensor 200 includes a magnet 202, a magnetic sensing element 204, one or more flux concentrators 206 rigidly secured relative to the magnetic sensing element 204 and a movably mounted flux concentrator 208 which enables the throttle position sensor 200 to be adjusted mechanically without the need for potentiometers and the like. In this embodiment, the magnet 202 is carried by a drive arm assembly 210 rotatably mounted relative to the magnetic sensing element 204 and the stationary mounted flux concentrators 206 and 208. As shown by the direction of the arrows 212, the magnet 202 is adapted to rotate about an axis 214.

The magnet 202 is formed as a generally circular element with a center aperture 216. The magnet 202 is formed such that each semicircular portion forms a pole. In particular, a semicircular portion 218 forms a south pole, while a semicircular portion 220 forms a north pole.

The magnetic sensing element 204 and the rigidly mounted flux concentrators 206 are carried by a housing 221; the housing 221 being formed from a non-magnetically conductive material; for example, plastic, brass or aluminum. In particular, the housing 221 as best shown in FIG. 17 is formed with a generally cylindrical portion 222 closed on one end 224 and an annular skirt portion 226. The magnetic sensing element 204 may be sandwiched between the rigidly mounted flux concentrators 206 and carried by the closed end 224 of the cylindrical portion 222 of the housing 221. A notch 228 may be formed in the closed end 224 for capturing the magnetic sensing element 204 to facilitate proper orientation of the magnetic sensing element 204 relative to the housing 221.

The outer diameter of the cylindrical portion 222 of the housing 221 may be formed to be relatively smaller than the diameter of the centrally disposed aperture 216 in the circular magnet 202. Such a configuration enables the cylindrical portion 222 of the housing 221 to be disposed within the aperture 216 in order to reduce the overall axial length of the sensor 200.

A cover 230 is provided and adapted to be rigidly secured to the throttle body 27 (FIG. 1) in a similar manner as discussed above. The cover 230 is formed as a generally cylindrical member with at least a partial interior annular shoulder 232 and a mouth portion 234. The annular shoulder 232 defines a first interior diameter and a second interior diameter. The first interior diameter is selected to be slightly larger than an outer diameter of the skirt portion 226 of the housing 221. An O-ring 227 may be used to seal the housing 221 relative to the cover 230 to prevent the potting material from getting into the area of the drive arm 235. The O-ring 227 may be disposed in an annular notch 229 formed in the housing 221.

The second interior diameter of the cover 230 is relatively smaller than the first interior diameter. The size of the second interior diameter of the cover 230 is selected to enable the drive arm assembly 210 to rotate freely therewithin.

The drive arm assembly 210 includes a drive arm 235 formed as an annular member with an irregular shape defining an annular well portion 236 and a drive portion 238. The annular well portion 236 is formed to receive the cylindrical portion 222 of the housing 221 to enable the overall axial length of the sensor 200 to be reduced in a manner as discussed above. The drive portion 238 is adapted to be coupled to the throttle shaft 26 in a manner as discussed above such that the drive arm assembly 210 rotates with a throttle shaft 26.

A helical spring 240 is used to bias the drive arm assembly 210 to a predetermined position, for example, the position shown in FIG. 17. In particular, a helical spring 240 is disposed about the outer diameter of the drive arm 235. One end (not shown) of the helical spring 240 is rigidly secured to the drive arm 235. The other end 242 of the spring 240 is rigidly secured to the cover 230. As such, rotation of the drive arm assembly 210 relative to the cover 230 can cause compression or tension of the spring 240 to bias the drive arm assembly 210.

The well portion 236 of the drive arm 235 is formed with an interior annular shoulder 243. The dimensions of the annular shoulder 243 are selected to enable the circular magnet 202 to be flush with an interior annular wall 244 of the drive arm 235.

The sensor 200 also includes a printed circuit board (PCB) 245. The PCB 245 is carried by the cylindrical portion 222 of the housing 221 for providing an electrical path between the magnetic sensing element 204 and a set of external electrical leads 246. In particular, if a Hall effect device is used for the magnetic sensing element 204, such a device will have a plurality of electrical leads 248. The PCB 245 is formed to provide an electrical path between the electrical leads 246 and 248 in a manner as discussed above.

An important aspect of the invention is the mechanical method for adjusting the sensitivity of the sensor 200 which eliminates the problems discussed above with sensors with electronic sensitivity adjustments. The offset voltage of the sensor 200 is adjusted in a similar manner as discussed above; namely, rotating the cylindrical portion 221 and the sensing plane of the magnetic sensing element 204 with respect to the magnet 202.

The sensitivity of the sensor 200 is adjusted by varying the axial distance between the flux concentrator 208 and the magnetic sensing element 204. As best shown in FIG. 17, the flux concentrator 208 is carried by the cylindrical portion 222 of the housing 221 with a slight friction or interference fit to enable the axial distance relative to the magnetic sensing element 204 to be varied. More specifically, the flux concentrator 208 is formed in a generally circular shape with a central aperture 250. The diameter of the central aperture 250 is selected to be slightly smaller than the outer diameter of the cylindrical portion 222 of the housing 221 to enable the flux concentrator 208 to be carried thereby in order to enable the axial distance between the flux concentrator 208 and the magnetic sensing element 204 to be varied. Once the axial distance of the flux concentrator 208 is set, a portion of the housing 221 is potted with a suitable potting material 249, such as epoxy, to seal the assembly from dust, moisture and other harmful contaminants. The annular skirt portion 226 of the housing 221 protects the bottom portion (FIG. 17) from the potting material 249 in order to allow the drive arm assembly 210 to rotate freely.

In operation, rotation of the throttle shaft 26 causes rotation of the drive arm assembly 210. Since the magnet 202 is rigidly secured to the drive arm assembly 210, such rotation will cause the relative angular position of the north and south magnetic poles 202 to vary relative to a sensing plane of the magnetic sensing element 204. Such a change will cause the output signal from the magnetic sensing element 204 to vary as a function of the change in angular position of the magnet 202 and the throttle shaft 26.

While the invention has been described with reference to details of the embodiments shown in the drawings, these details are not intended to limit the scope of the invention as described in the appended claims.

What is claimed and desired to be secured by Letters Patent of the United States is:

1. An angular position sensor for sensing the angular position of a pivotally mounted device disposed in a predetermined housing about a predetermined pivot axis, comprising:

a sensor housing, said sensor housing adapted to be mechanically coupled to said predetermined housing;

means for providing a mechanical coupling to said pivotally mounted device, rotatably mounted relative to said sensor housing;

a single generally circular magnet with a central generally circular aperture, said magnet having north and south magnetic poles and having a predetermined axial length; and means responsive said providing means for generating an electrical signal representative of the angular position of said pivotally mounted device, said generating means including a magnetic flux responsive device, said magnetic flux responsive device being at least partially disposed in said central aperture of said magnet, said predetermined axial length being selected to be substantially the same size as a single magnetic flux responsive element.

2. An angular position sensor as recited in claim 1, wherein said magnet is a circular magnet with a central aperture defining two arcuate portions having opposite magnetic polarities along the outer circumference of the magnet.

3. An angular position sensor as recited in claim 1, wherein said sensing means includes a Hall effect device.

4. An angular position sensor as recited in claim 1, wherein said sensing means includes one or more flux concentrators.

5. An angular position sensor as recited in claim 4, further including means for carrying said flux concentrators and said Hall effect device, such that said Hall effect device is sandwiched between said flux concentrators.

6. A contactless angular position sensor for sensing the angular position of a pivotally mounted device about a predetermined pivot axis, said angular position sensor comprising:

a housing;

a generally circular magnet having north and south magnetic poles, said magnet having a central generally circular aperture and coaxially arranged relative to said pivot axis defining predetermined arcuate portions, said magnet having a predetermined axial length;

means for mechanically coupling said magnet to said pivotally mounted device;

a magnetic sensing device for sensing magnetic flux and generating an electrical signal representative of the angular position of said pivotally mounted device, said magnetic sensing element being disposed in said central aperture of said magnet, said predetermined axial length being selected to be substantially the same size as a single magnetic flux responsive device.

7. A contactless angular position sensor as recited in claim 6, wherein said arcuate portions of said magnet have opposite magnetic polarities along the outer circumference of said magnet.

8. An angular position sensor as recited in claim 6, wherein said predetermined arcuate portions are semicircular.

9. An angular position sensor as recited in claim 6, wherein said magnetic sensing element is disposed between opposing north and south poles of said magnet.

10. An angular position sensor as recited in claim 6, wherein said magnetic sensing element is a Hall effect device.

11. An angular position sensor as recited in claim 6, further including at least one flux concentrator disposed adjacent said sensing element within said central aperture of said magnet.

12. An angular position sensor as recited in claim 6, further including a generally circular flux concentrator disposed generally coaxially relative to said circular magnet.

13. An angular position sensor as recited in claim 1, wherein said magnet is a circular magnet with a central aperture defining an inner diameter formed with two arcuate portions having opposite magnetic polarities.

14. A contactless angular position sensor as recited in claim 6, wherein said arcuate portions of said magnet have opposite magnetic polarities along an inner diameter of said magnet.

* * * * *

UNITED STATES PATENT AND TRADEMARK OFFICE
CERTIFICATE OF CORRECTION

PATENT NO. : 5,818,223
DATED : October 6, 1998
INVENTOR(S) : Wolf

It is certified that error appears in the above-indentified patent and that said Letters Patent is hereby corrected as shown below:

Column 11, line 16: please add --to-- after "responsive".

Column 11, line 30: delete "sensing" and insert --generating-- therefor.

Column 11, line 32: delete "sensing" and insert --generating-- therefor.

Signed and Sealed this

Eighth Day of June, 1999

Attest:

Q. TODD DICKINSON

*Attesting Officer*  Acting Commissioner of Patents and Trademarks

UNITED STATES PATENT AND TRADEMARK OFFICE
CERTIFICATE OF CORRECTION

PATENT NO. : 5,818,223
DATED : October 6, 1998
INVENTOR(S) : Wolf

It is certified that error appears in the above-identified patent and that said Letters Patent is hereby corrected as shown below:

IN THE CLAIMS:

Claim 6, line 14: please add --to-- after "responsive".

Claim 9, line 2: delete "sensing" and insert --generating-- therefor.

Claim 10, line 2: delete "sensing" and insert --generating-- therefor.

Signed and Sealed this

Tenth Day of August, 1999

Attest:

Q. TODD DICKINSON

*Attesting Officer*  Acting Commissioner of Patents and Trademarks